(No Model.)

C. L. O. BELL.
VEHICLE WHEEL.

No. 349,138. Patented Sept. 14, 1886.

ATTEST.
J. Henry Kaiser.
Harry L. Ames.

INVENTOR.
Chas. L. O. Bell.
By L. Deane.
his atty.

UNITED STATES PATENT OFFICE.

CHARLES L. O. BELL, OF ROLLING PRAIRIE, INDIANA.

VEHICLE-WHEEL.

SPECIFICATION forming part of Letters Patent No. 349,138, dated September 14, 1886.

Application filed August 3, 1885. Serial No. 173,421. (No model.)

*To all whom it may concern:*

Be it known that I, CHARLES L. O. BELL, a citizen of the United States, residing at Rolling Prairie, in the county of La Porte and State of Indiana, have invented certain new and useful Improvements in Vehicle-Wheels, of which the following is a specification, reference being had therein to the accompanying drawings.

Figure 1:
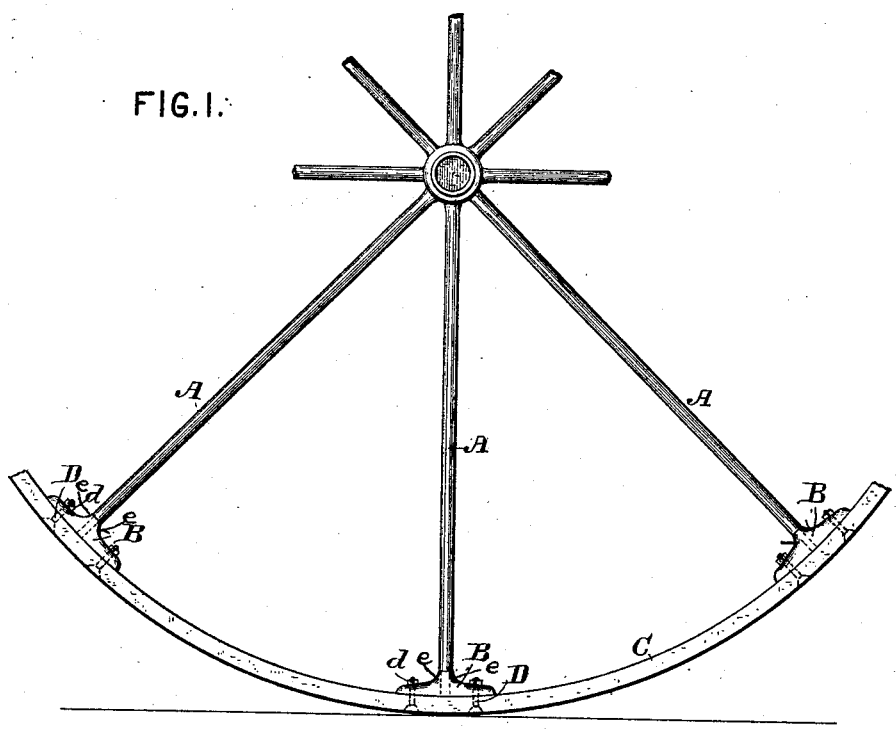
Figure 2:
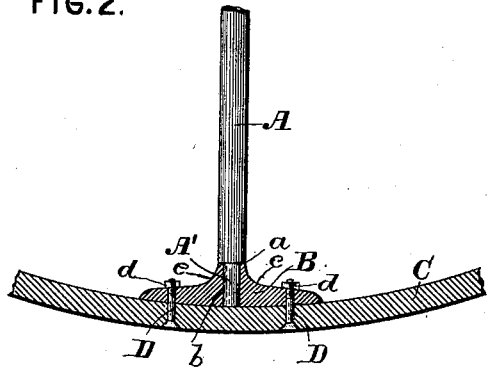

Figure 1 is a side elevation showing a portion of a wheel. Fig. 2 is a vertical section in detail of the bracket, tire, and spoke.

This invention relates to improvements in vehicle-wheels; and the novelty consists more particularly in the construction and combination of the several parts without the wooden felly, all as will now be more fully set out and claimed, reference being had to the accompanying drawings, in which—

A denotes the spokes, each of which is shouldered at $a$, where it rests against the malleable-iron connecting piece or bracket B. The extension A' of the spoke, which passes through a suitable central perforation or hole, $b$, in said bracket, is of somewhat less size than the main part of the spoke. This end of the spoke fits close and tight against the tire C. The bracket B is perforated at its thickest part to receive the end of the spoke, and is secured to and upon the inside of the tire by means of headed bolts D, one at each end, passing through suitable holes in the ends of the bracket. These bolts are held by means of nuts $d$ on their inner ends, which are threaded for this purpose. By this method of fitting the end of the spoke into its deep socket and abutting its end against the tire, the spoke has a peculiarly firm seat, and cannot be shaken loose in it. Not only does this construction admit of dispensing with a wooden felly, but in case of any damage to the spoke, rendering a new one necessary, it can be easily removed by merely loosening the nuts $d$ and withdrawing the bolts, when the bracket can be readily thrust away from the tire. The new spoke is as easily substituted.

I am aware that it is not broadly new to make a wheel without a wooden felly, nor to make a wheel with a spoke shouldered at its outer end, where it fits on the tire, nor to use a nippled bracket to hold a spoke on the felly, nor a spoke screw-threaded at its outer end to fit into a bracket; but I am not aware of a wheel in which are embodied the features in the way and for the purposes now described and claimed.

Having now described my invention, what I consider new, and desire to secure by Letters Patent, is—

A vehicle-wheel in which are combined the following elements, viz: a tire and spokes shouldered near their outer ends, and each fitted thereby into a bracket which is perforated at its thickest part and secured to the tire by bolts and nuts, whereby the outer ends of the spokes fit against the tire and a felly is dispensed with, all in the manner and for the purposes described.

In testimony whereof I affix my signature in presence of two witnesses.

CHARLES L. O. BELL.

Witnesses:
 JOSEPH H. CAMFIELD,
 B. F. SHIVELY.